United States Patent
Sakamoto et al.

(10) Patent No.: US 9,602,395 B2
(45) Date of Patent: Mar. 21, 2017

(54) APPARATUS AND METHOD FOR SWITCHING COMMUNICATION CHANNELS HAVING REDUNDANT CONFIGURATION

(71) Applicant: FUJITSU LIMITED, Kawasaki-shi, Kanagawa (JP)

(72) Inventors: Toshiyuki Sakamoto, Yuki (JP); Yutaka Hayama, Sano (JP); Hiroshi Fukaya, Chikusei (JP); Tsutomu Chikazawa, Utsunomiya (JP); Kouji Kurihara, Ashikaga (JP)

(73) Assignee: FUJITSU LIMITED, Kawasaki (JP)

( * ) Notice: Subject to any disclaimer, the term of this patent is extended or adjusted under 35 U.S.C. 154(b) by 322 days.

(21) Appl. No.: 14/064,492

(22) Filed: Oct. 28, 2013

(65) Prior Publication Data

US 2014/0269264 A1    Sep. 18, 2014

(30) Foreign Application Priority Data

Mar. 18, 2013  (JP) .................... 2013-055664

(51) Int. Cl.
*H04L 12/703* (2013.01)
*H04L 12/725* (2013.01)
(Continued)

(52) U.S. Cl.
CPC .............. *H04L 45/28* (2013.01); *H04L 45/22* (2013.01); *H04L 45/30* (2013.01); *H04L 41/0663* (2013.01)

(58) Field of Classification Search
CPC ..... H04L 41/0663; H04L 45/22; H04L 45/28; H04L 45/30; H04L 45/302; H04L 41/0654; H04L 41/0659; H04L 41/0668
See application file for complete search history.

(56) References Cited

U.S. PATENT DOCUMENTS

| 8,797,844 B1* | 8/2014 | Strahle | H04L 45/28 370/219 |
| 2005/0099951 A1* | 5/2005 | Mohan | H04L 43/0811 370/241 |

FOREIGN PATENT DOCUMENTS

| JP | 11-331193 | 11/1999 |
| JP | 2002-135308 | 5/2002 |

OTHER PUBLICATIONS

International Telecommunication Union, ITU-T—G.8031/Y.1342, Series G: Transmission Systems and Media, Digital Systems and Networks, Series Y: Global Information Infrastructure, Internet Protocol Aspects and Next-Generation Networks, "Ethernet Linear Protection Switching", Nov. 2009.

(Continued)

*Primary Examiner* — Khoa Huynh
(74) *Attorney, Agent, or Firm* — Fujitsu Patent Center

(57) ABSTRACT

An apparatus for switching multiple communication channels having a redundant configuration, includes a fault determining section configured to determine an occurrence of a fault of data received from a transmitting apparatus via one of the multiple communication channels having the redundant configuration, the data being set with one of multiple classes; a class control section configured to switch the data in one of the multiple classes being determined as having the fault, to one of the multiple communication channels having the redundant configuration being unused for transmission of the data in the class; a switching control section configured to generate switching information including information about the class determined to have the fault and a destination communication channel for the data in the class to be switched to; and a transmission section configured to transmit the switching information to the transmitting apparatus.

15 Claims, 17 Drawing Sheets

(51) Int. Cl.
*H04L 12/707* (2013.01)
*H04L 12/24* (2006.01)

(56) References Cited

OTHER PUBLICATIONS

International Telecommunication Union, ITU-T—Y.1731, Series Y: Global Information Infrastructure, Internet Protocol Aspects and Next-Generation Networks, "OAM functions and mechanisms for Ethernet based networks", Feb. 2008.

* cited by examiner

FIG.3
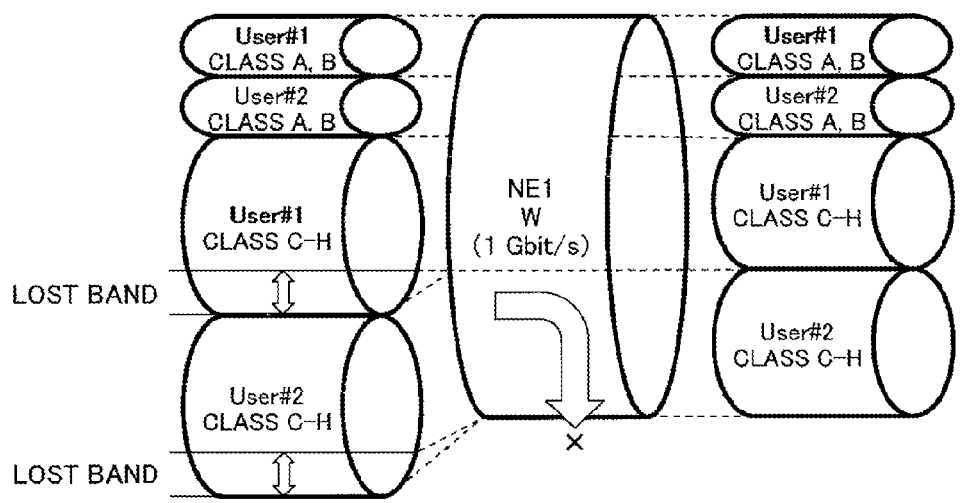
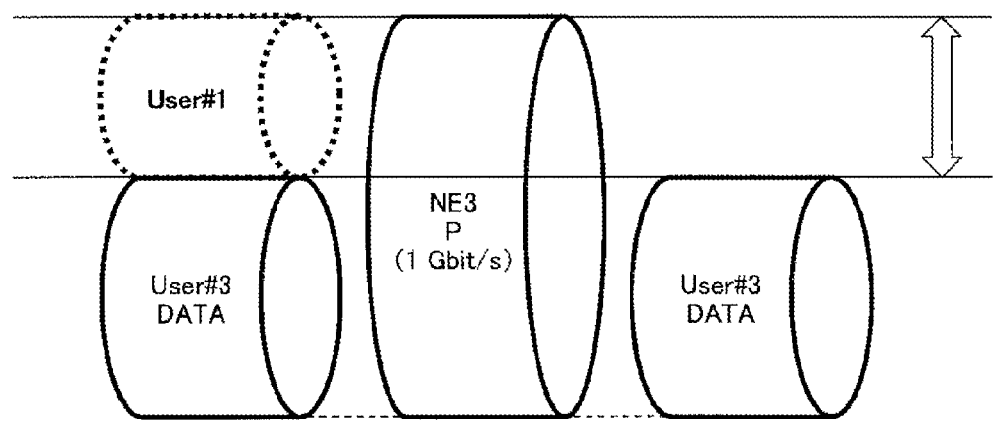

FIG.5
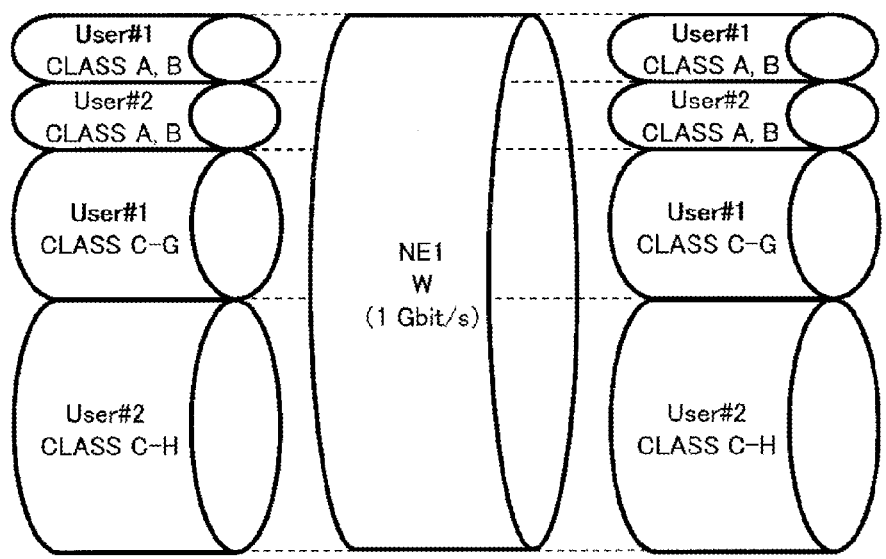
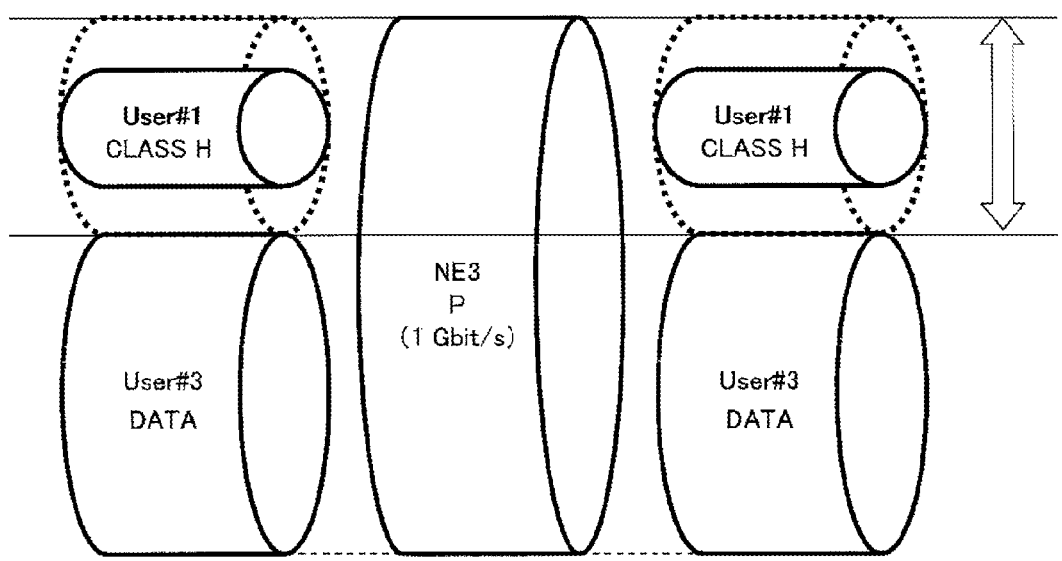

FIG.9

| | |
|---|---|
| 1111 | Lockout of protection (LO) |
| 1110 | Signal fail for protection (SF-P) |
| 1101 | Forced switch (FS) |
| 1011 | Signal fail for working (SF) |
| 1001 | Signal degrade (SD) (Note) |
| 0111 | Manual switch (MS) |
| 0110 | Manual switch to working (MS-W) |
| 0101 | Wait to restore (WTR) |
| 0100 | Exercise (EXER) |
| 0010 | Reverse request (RR) |
| 0011 | Class Protection(CP) |
| 0001 | Do not revert (DNR) |
| 0000 | No request (NR) |
| Others | Reserved for future international standardization |

FIG.10A

| MSB | bit 6 | bit 5 | bit 4 | bit 3 | bit 2 | bit 1 | LSB |
|---|---|---|---|---|---|---|---|
| CLASS C W/P | CLASS D W/P | CLASS E W/P | CLASS F W/P | CLASS G W/P | CLASS H W/P | — | RS,BS W/P |

FIG.10B

|  | Work | Protect |
|---|---|---|
| CLASS C | 0 | 128 |
| CLASS D | 0 | 64 |
| CLASS E | 0 | 32 |
| CLASS F | 0 | 16 |
| CLASS G | 0 | 8 |
| CLASS H | 0 | 4 |
| RS,BS | 0 | 1 |

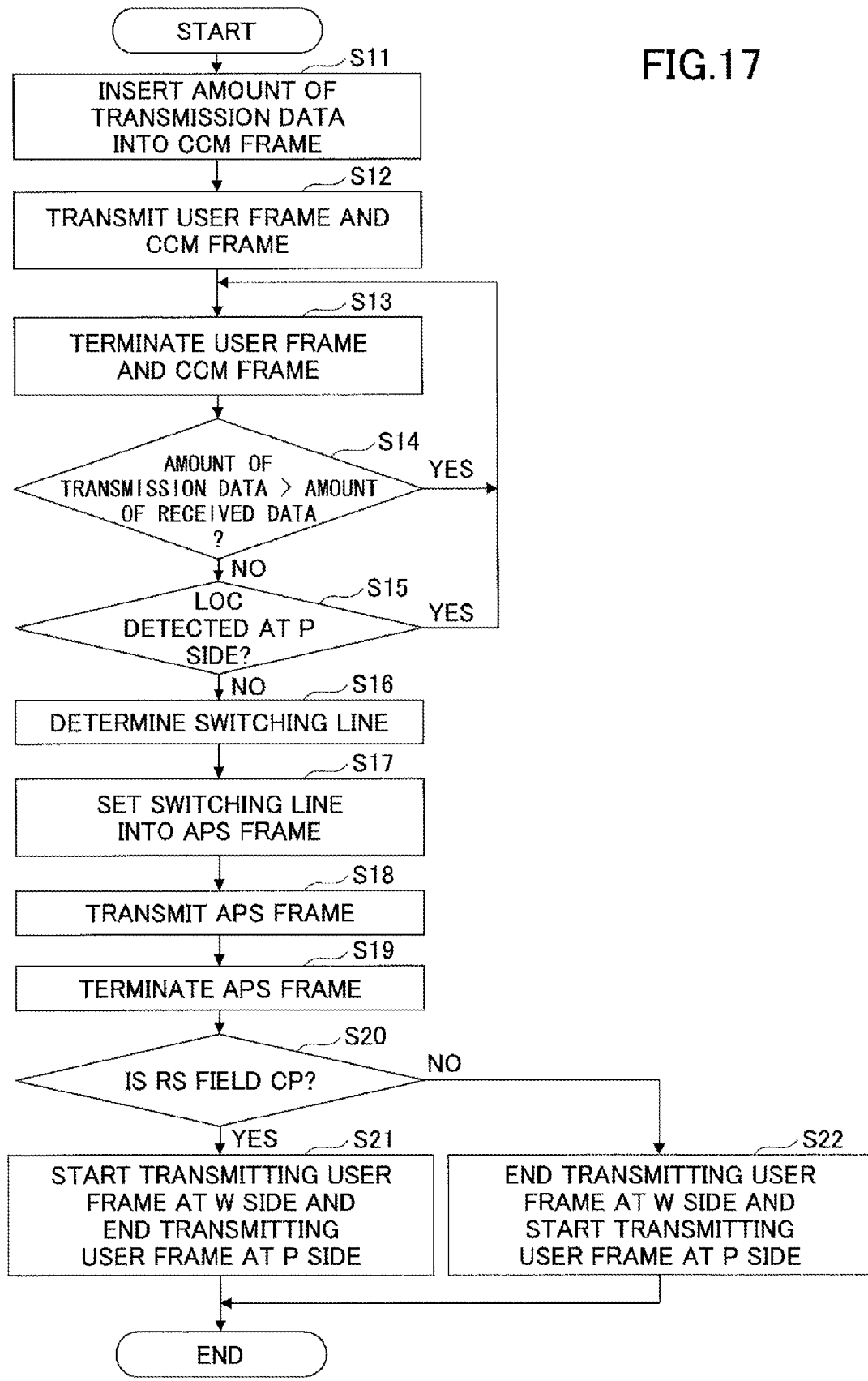

APPARATUS AND METHOD FOR SWITCHING COMMUNICATION CHANNELS HAVING REDUNDANT CONFIGURATION

CROSS-REFERENCE TO RELATED APPLICATIONS

This application is based upon and claims the benefit of priority of the prior Japanese Priority Application No. 2013-055664 filed on Mar. 18, 2013, the entire contents of which are hereby incorporated by reference.

FIELD

The disclosures herein generally relate to an apparatus and a method for switching communication channels having a redundant configuration.

BACKGROUND

There is a known technology in Ethernet (trademark) called "linear protection switching" that automatically switches a working channel and a protection channel between two points in a VLAN (Virtual Local Area Network) level (see, for example, Non-Patent Documents 1-2). In linear protection switching, switching is executed with units of service paths (VLAN) if a communication channel fault is detected, using OAM (Operations, Administration, and Maintenance) functions for a network.

A transmitted and received packet in a VLAN is assigned one of Classes A-H depending on its priority. A packet loss problem in a high-priority Class such as A or B is solved by switching communication channels by linear protection switching. However, linear protection switching is not executed if a packet loss occurs in a low-priority Class because these low-priority Classes C-H are not guaranteed a bandwidth.

On the other hand, even if a packet loss occurs in a low-priority Class on a working channel, a protection channel is kept in an empty state for guaranteeing a minimum bandwidth for a high-priority Class, onto which a packet in a low-priority Class cannot be switched and transmitted. Therefore, the band of such a protection channel is not utilized, which is a waste of network resources.

Also, even if a working channel requires more bands, a protection channel cannot be utilized.

One might consider to add new communication channels, but it increases costs.

RELATED-ART DOCUMENTS

Non-Patent Documents

[Non-Patent Document 1] "Ethernet Linear Protection Switching", JT-G8031, Telecommunication Technology Committee (a General Incorporated Association in Japan)
[Non-Patent Document 2] "OAM functions and mechanisms for Ethernet based networks", JT-Y1731, Telecommunication Technology Committee

SUMMARY

According to at least one embodiment of the present invention, an apparatus for switching multiple communication channels having a redundant configuration, includes: a fault determining section configured to determine an occurrence of a fault of data received from a transmitting apparatus via one of the multiple communication channels having the redundant configuration, the data being set with one of multiple classes; a class control section configured to switch the data in one of the multiple classes being determined as having the fault, to one of the multiple communication channels having the redundant configuration and being unused for transmission of the data in the class; a switching control section configured to generate switching information including information about the class determined to have the fault and a destination communication channel for the data in the class to be switched to; and a transmission section configured to transmit the switching information to the transmitting apparatus.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 3 is a schematic view illustrating a switching based on conventional linear protection in terms of Classes;
FIG. 5 is a schematic view illustrating a switching based on linear protection in terms of Classes according to an embodiment of the present invention;
FIG. 9 is a schematic view illustrating code allocation of Request/State field of an APS frame;
FIGS. 10A-10B are schematic views illustrating a structure of Request/Bridged Signal byte of an APS frame;
FIG. 17 is a flowchart illustrating a switching method based on linear protection according to an embodiment of the present invention.

DESCRIPTION OF EMBODIMENTS

In the following, embodiments of the present invention will be described with reference to the drawings. According to at least one embodiment of the present invention, it is possible to determine a fault of data in each of Classes to switch communication channels, which uses a vacant band in a network effectively.

<Linear Protection Switching>

Figure 1:
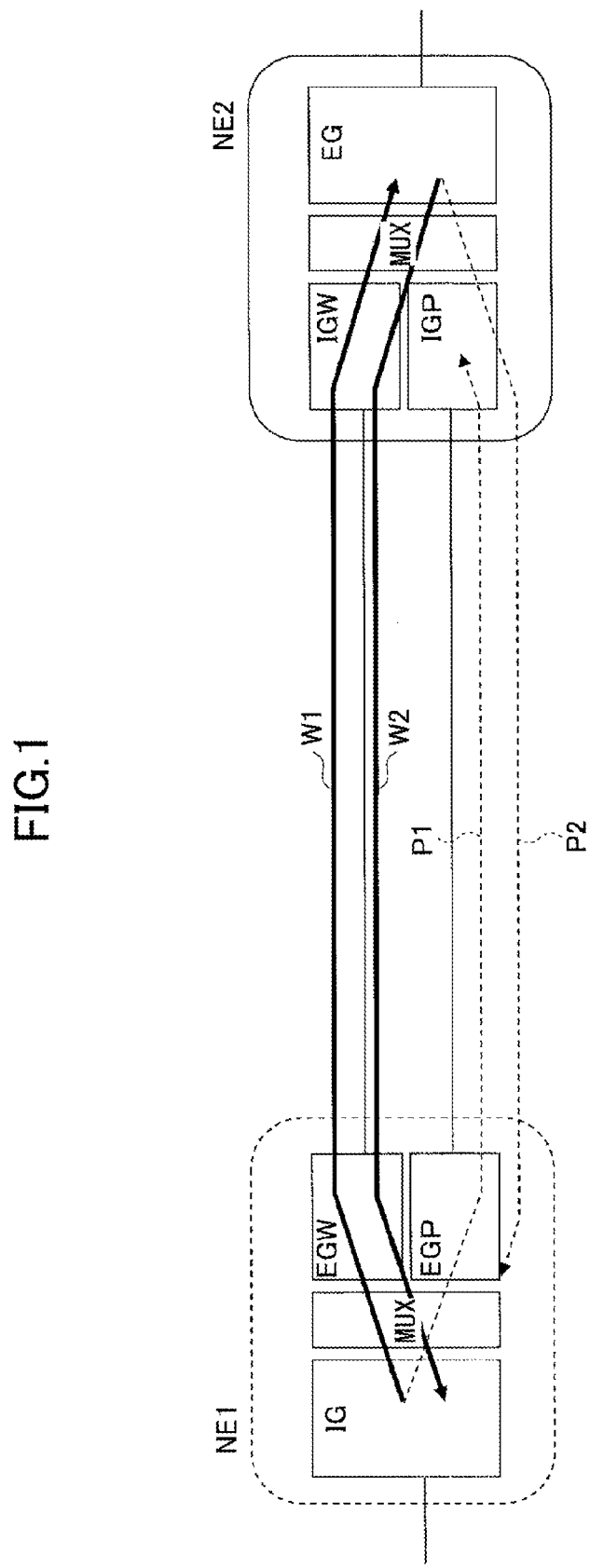
FIG. 1 is a schematic view illustrating linear protection.

Linear protection will be described with reference to FIG. 1. A configuration illustrated in FIG. 1 includes two nodes NE1-NE2, VLAN-level working channels W1-W2 and protection channels P1-P2 between the nodes that constitute a redundant configuration.

The node NE1 transfers data from an ingress section IG to a working egress section EGW via a multiplexing section MUX to transmit the data to the working channel W1. Also, the node NE1 transfers data from the working channel W1 to the ingress section IG via the working egress section EGW and the multiplexing section MUX.

The node NE2 transfers data from the working channel W1 to an egress section EG via a working ingress section IGW and a multiplexing section MUX. Also, the node NE2 transfers data from the egress section EG to the working ingress section IGW via the multiplexing section MUX to transmit the data to the working channel W1.

If linear protection switching is performed between the nodes NE1 and NE2, packets transmitted and received via the working channels W1-W2 as above are transmitted and received via the protection channels P1-P2.

Figure 2:
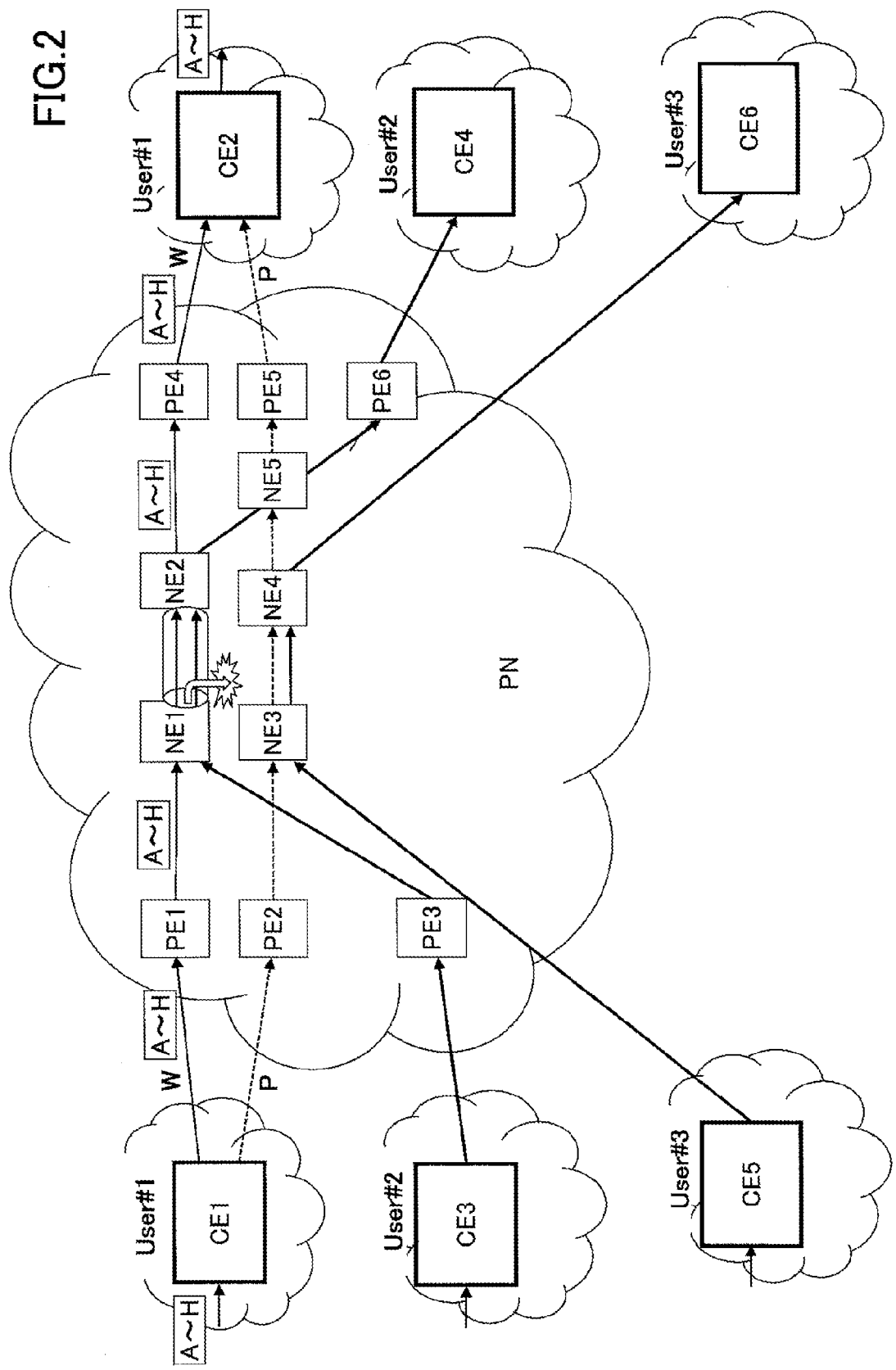
FIG. 2 is a schematic view illustrating a switching based on conventional linear protection.

With reference to FIG. 2, switching based on conventional linear protection will be described. In FIG. 2, edge nodes CE1 and CE2, CE3 and CE4, and CE5 and CE6 in a network that correspond to Users #1, #2, and #3, respectively, communicate with each other via a provider network PN. The provider network PN includes edge nodes PE1-PE6 and intermediate nodes NE1-NE5. For the sake of simplicity, only one communication direction is designated in FIG. 2, and for Users #2 and #3 only, working channels are illustrated with solid lines.

Assume that linear protection switching is applied between the edge nodes CE1 and CE2 of User #1.

Between the edge nodes CE1 and CE2 of User #1, packets of all Classes A-H are usually transmitted and received through a working channel W through the nodes PE1, NE1, NE2, and PE4. A protection channel P is provided between the edge nodes CE1 and CE2 of User #1 that goes through the nodes PE2, NE3, NE4, NE5, and PE5.

For example, if a fault is detected on the working channel W, communication between the edge nodes CE1 and CE2 of User #1 is switched onto the protection channel P for a VLAN unit, which unit includes communication in all Classes A-H.

Also, the nodes NE1 and NE2 existing on the working channel W of User #1 pass packets transmitted and received between the edge nodes CE3 and CE4 of User #2 via the working channel W.

The nodes NE3 and NE4 existing on the protection channel P of User #1 pass packets transmitted and received between the edge nodes CE5 and CE6 of User #3 via the working channel W.

With reference to FIG. 3, switching based on conventional linear protection will be described in terms of Classes. FIG. 3 illustrates packets passing through the nodes NE1 and NE3 in FIG. 2 in terms of Classes, assuming a case where a packet loss is generated at the node NE1 in FIG. 2 for packets in Classes A-H that are transmitted and received on the working channel W of User #1.

As illustrated in FIG. 3, the node NE1 is on the working channel W of User #1 that has a bandwidth of 1 Gbps, and the node NE3 is on the protection channel P of User #1 that has a bandwidth of 1 Gbps.

Packets in Classes A-H of User #1 flow into the node NE1 from the left side, and packets in Classes A-H User #2 flow into the node NE1 from the right side. Assume that, for example, Classes A, B, and C-H of User #1 have bandwidths of 100, 100, and 400 Mbps, respectively. Similarly, assume that Classes A, B, and C-H of User #2 also have bandwidths of 100, 100, and 400 Mbps, respectively.

Among Classes of packets flowing into the node NE1, Classes A and B of User #1 and Classes A and B of User #2 are high-priority Classes. Also, each of these Classes has the bandwidth of 100 Mbps, which sums up to 400 Mbps that is less than the bandwidth of 1 Gbps of the working channel W at the node NE1. Therefore, packets in Classes A and B pass through the node NE1 without a packet loss, and are transmitted to the destination node.

However, Classes C-H of User #1 and Classes C-H of User #2 are low-priority Classes, whose summed bandwidth added to the above Classes A and B exceeds the bandwidth of 1 Gbps. Therefore, a packet loss occurs in Classes C-H as the bandwidth is not sufficient at the node NE1 (designated with X in FIG. 3). For example, a packet loss occurs in a part of Classes C-H of User #1 corresponding to 100 Mbps of no guaranteed bandwidth, and for a part of Classes C-H of User #2 corresponding to 100 Mbps of no guaranteed bandwidth.

Under such a circumstance as illustrated in FIG. 3, linear protection switching is not usually performed because a packet loss occurs in low-priority Classes C-H. Therefore, a packet loss in Classes C-H is left as it is.

On the other hand, data of User #3 flows into the node NE3 from the left side. As the node NE3 is on the protection channel P of User #1, the guaranteed minimum bandwidth for User #1 remains unused.

As described above, if a packet loss occurs for low-priority Classes C-H on a working channel W without guaranteed bandwidth, it cannot be switched to an unused protection channel, which results in inefficient usage of network resources.

If conventional linear protection switching is performed for User #1 under the circumstance in FIG. 3, all Classes A-H of User #1 are switched from the working channel W through the node NE1 to the protection channel P through the node NE3. On the protection channel P at the node NE3, only a guaranteed minimum bandwidth less than the bandwidth at the node NE1 (for example, 400 Mbps in total) is usually allocated for User #1. Therefore, a packet loss occurs similarly to FIG. 3 or even worse. Therefore, switching to the protection channel cannot prevent a packet loss in low-priority Classes C-H.

If a fault such as a packet loss occurs, it is desirable to utilize network resources efficiently by performing linear protection switching in terms of Classes using unused bands designated with double-arrow thick lines in FIG. 3.

<Linear Protection Switching in Terms of Classes>

Figure 4:
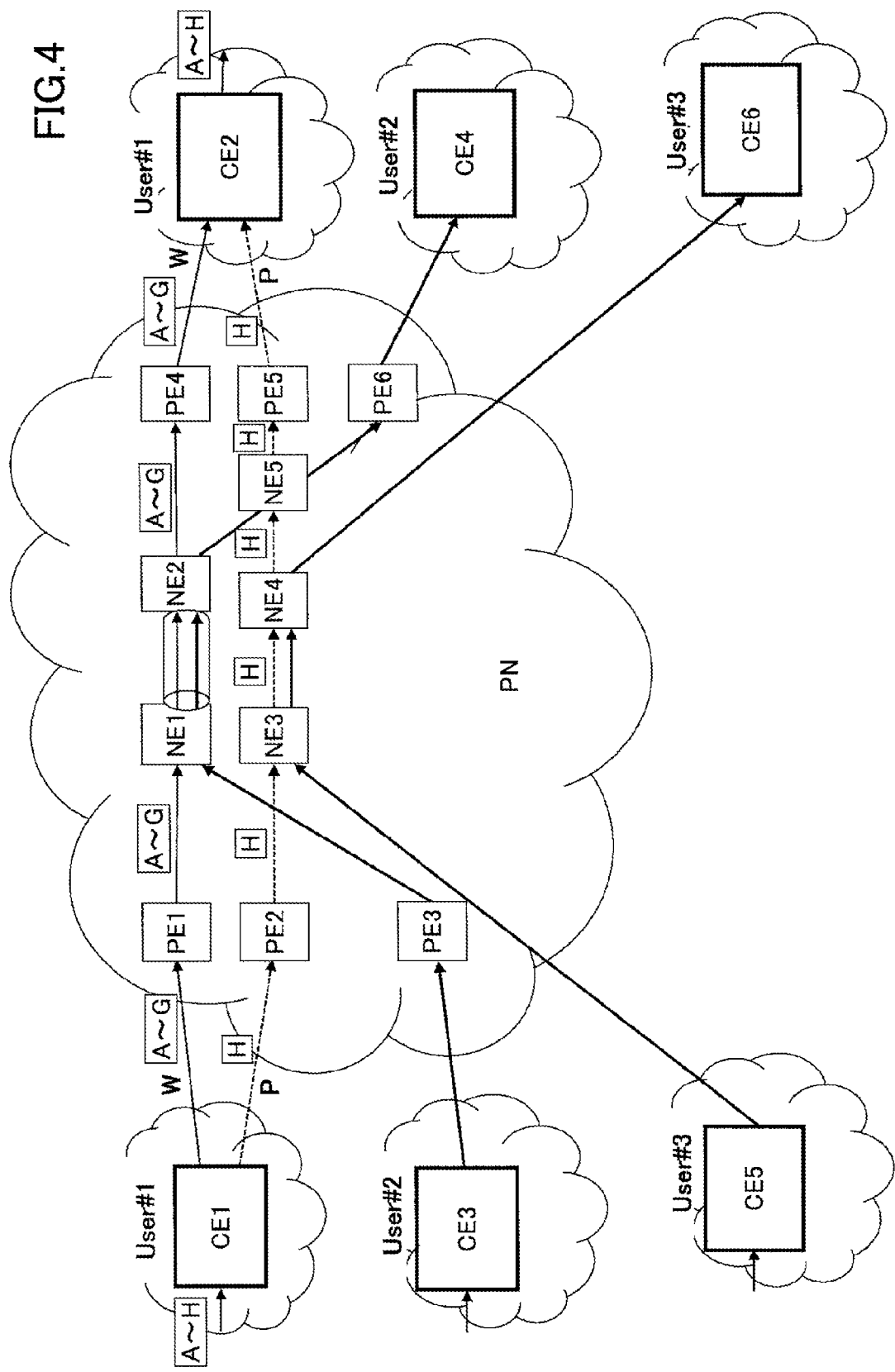
FIG. 4 is a schematic view illustrating a switching based on linear protection according to an embodiment of the present invention.

With reference to FIG. 4, linear protection switching in terms of Classes will be described. FIG. 4 is a schematic view illustrating switching based on linear protection according to the present embodiment of the present invention. Although FIG. 4 illustrates substantially the same configuration as FIG. 2, FIG. 4 differs from FIG. 2 in that packets in Classes A-G are communicated via the working channel W, and packets in Class H are communicated via the protection channel P.

As described with reference to FIGS. 2-3, assume that a packet loss occurs in low-priority Classes C-H. For example, if a packet loss occurs in the lowest priority Class H, linear protection switching is performed in terms of Classes in FIG. 4 so that packets in Class H are transmitted and received on the protection channel P.

With reference to FIG. 5, switching based on linear protection in terms of Classes will be described according to an embodiment of the present invention. FIG. 5 illustrates packets passing through the nodes NE1 and NE3 in FIG. 4 in terms of Classes, respectively, after linear protection switching is performed under the circumstance illustrated in FIG. 3.

In FIG. 5, packets in Classes A-G of User #1 flow into the node NE1 from the left side, and packets in Classes A-H of User #2 flow into the node NE1 from the right side. Data of User #3 and only Class H of User #1 flow into the node NE3. In this way, it is possible to prevent a packet loss occurring in Class H of User #1 in FIG. 3. Also, it does not have an influence on other Classes if only Class H of User #1 is switched.

<Frame Format>

The above linear protection switching in terms of Classes is executed using OAM functions. A frame will be described that is used for linear protection switching in terms of Classes.

Figure 6:
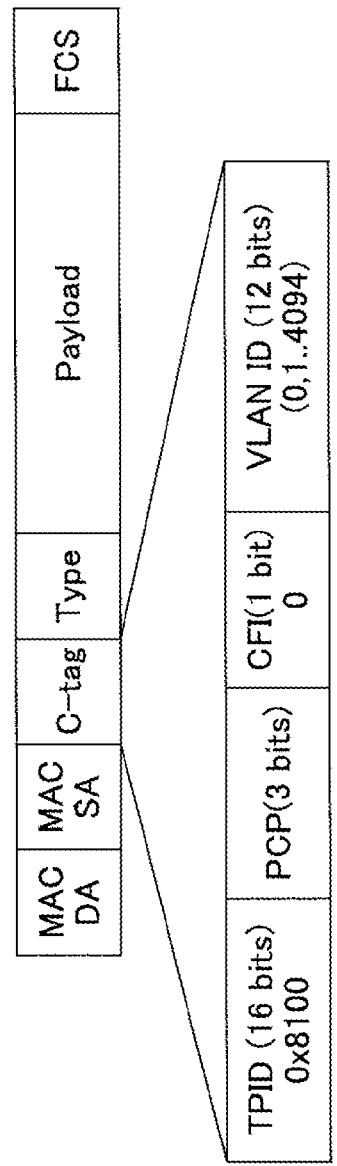
FIG. 6 is a schematic view illustrating a frame format of a tagged Ethernet frame.

A packet described above has a frame format called a "tagged Ethernet frame" illustrated in FIG. 6. FIG. 6 illustrates the frame format as a whole including a customer tag (C-tag), and a part of the frame format corresponding to C-tag in detail. A 3 bits wide PCP (Priority Code Point) field in C-tag specifies one of Classes A-H described above. Classes A-H are defined as follows:

Class A: for the highest-priority data (audio data) with a guaranteed bandwidth.
Class B: for high-priority data (image data) with a guaranteed bandwidth.
Classes C-G: for low-priority data (non-real-time data). Data is distributed depending on weights assigned to Classes (Deficit Weighted Round Robin: DWRR). Data may be supported with a guaranteed bandwidth or without a guaranteed bandwidth (best effort).
Class H: for the lowest-priority (non-real-time data) without a guaranteed bandwidth.

Among control frames that implement OAM functions, continuity check message (CCM) frames and automatic protection switching (APS) frames are used for linear protection switching. These control frames are usually allocated to Class A with a guaranteed bandwidth to be transmitted.

Also, these control frames are terminated at a Down MEP (Maintenance Entity Group End Point) defined in a network beforehand. For example, Down MEPs in FIG. 1 are the egress sections (EGW/EGP) of NE1 and the ingress sections (IGW/IGP) of NE2, and Down MEPs in FIGS. 2 and 4 are the egress sections (EGW/EGP) of CE1 and the ingress sections (IGW/IGP) of CE2.

Figure 7:
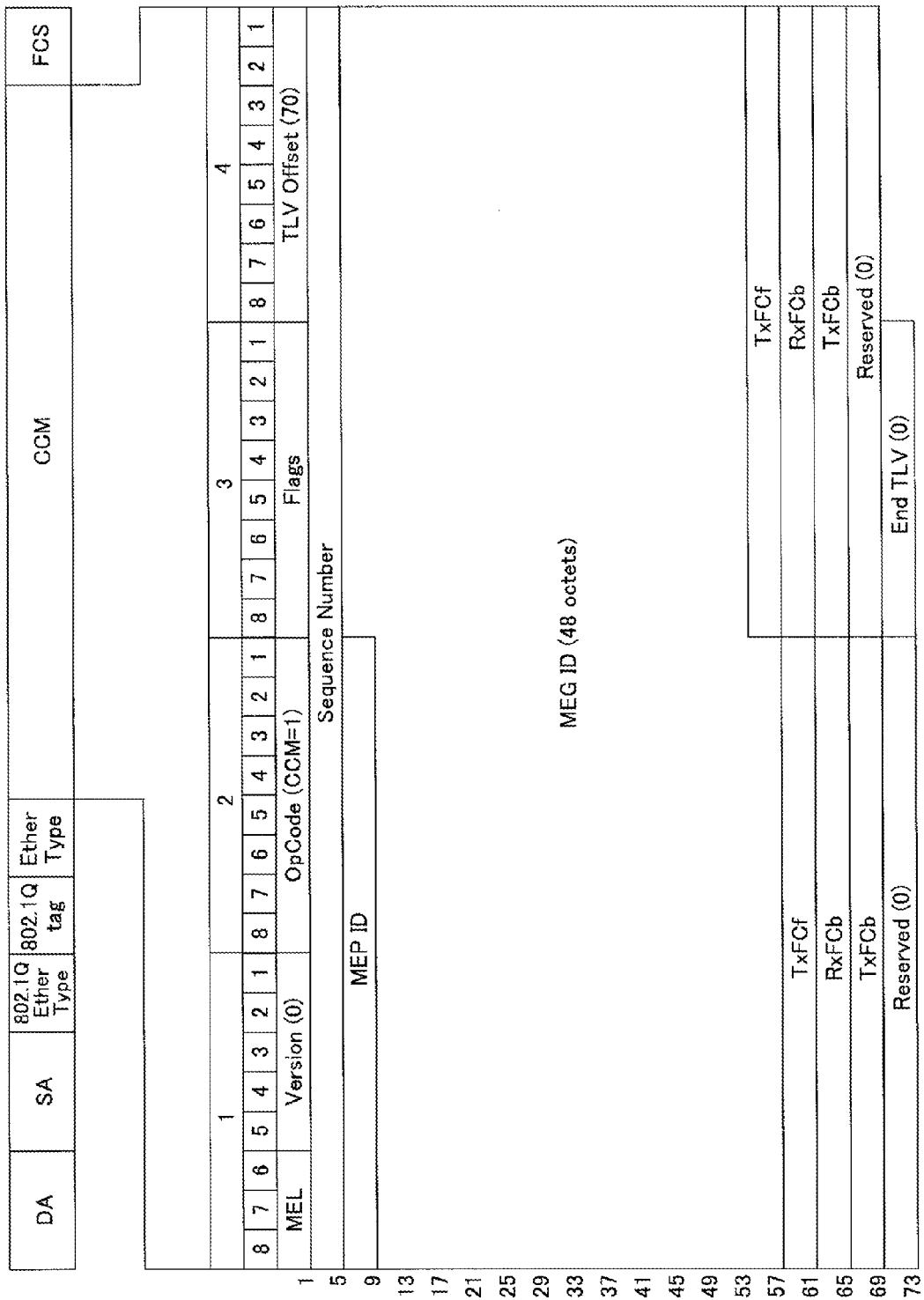
FIG. 7 is a schematic view illustrating a frame format of a CCM frame.

FIG. 7 is a schematic view illustrating a frame format of a CCM frame. CCM frames are provided for monitoring communication channel faults. A transmitting apparatus periodically transmits CCM frames on a working channel and a protection channel, respectively. A receiving apparatus monitors the CCM frames received from the communication channels, and determines that a communication channel fault occurs if the CCM frames are not periodically received or not received at all. If the receiving apparatus determines that a communication channel fault occurs, it replies with a CCM frame that designates a Remote Defect Indication (RDI). A receipt of such a CCM frame designating an RDI is one of the triggers for communication channel switching.

Upper three bits of a Reserved field of a CCM frame are used for distinguishing a Class. Correspondences between values of the upper three bits and Classes can be determined discretionally. The remaining 29 bits of the Reserved field are used for representing an amount of transmission data counted by the transmitting apparatus. The amount of transmission data may be represented with the number of bytes, the number of frames, or the like.

As a Class can be distinguished with the upper three bits of the Reserved field of a CCM frame, it is possible to monitor a communication channel fault and an amount of transmission data for each of Classes.

Figure 8:
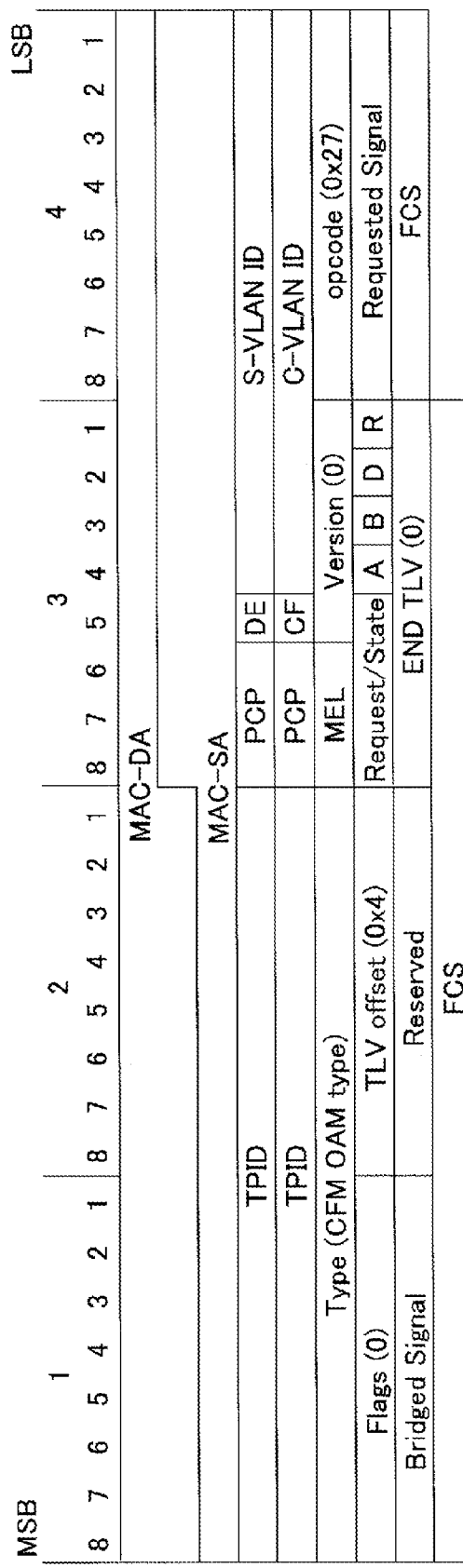
FIG. 8 is a schematic view illustrating a frame format of an APS frame.

FIG. 8 is a schematic view illustrating a frame format of an APS frame. An APS frame is used for controlling communication channel switching. If a trigger is generated for linear protection switching, for example, a communication channel fault is indicated with a CCM frame described above, and execution of linear protection switching is requested by transmitting an APS frame.

Request/State field and Request/Bridged Signal fields of an APS frame are used for linear protection switching in terms of Classes.

FIG. 9 is a schematic view illustrating code allocation of Request/State field of an APS frame. "Class Protection (CP)" is a newly defined code allocated with "0011" in FIG. 9. By transmitting an APS frame set with CP on a protection channel, linear protection switching in terms of Classes is requested.

FIGS. 10A-10B are schematic views illustrating a structure of a Request/Bridged Signal byte of an APS frame. FIG. 10A illustrates the structure of a one-byte long Request/Bridged Signal field. Using each of bits from MSB to bit 2, a destination communication channel, namely, a working channel ("0") or a protection channel ("1"), is specified for each of Classes C-H. Specifically, as illustrated in FIG. 10B, "0" is set for specifying working channels for all Classes, and "1" is set to a bit corresponding to a Class for specifying a protection channel.

Figure 11:
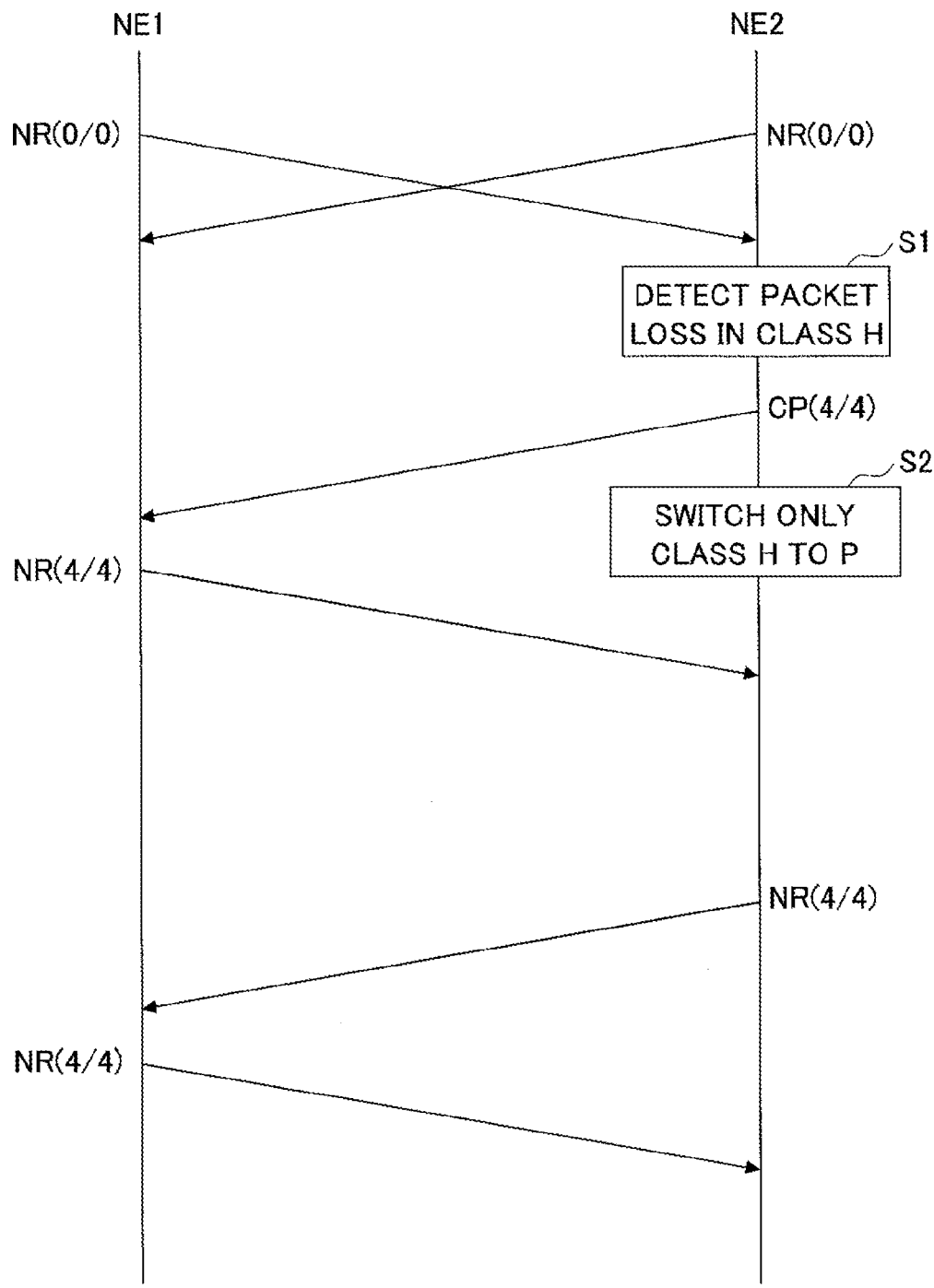
FIG. 11 is a sequence chart illustrating a switching using Class Protection of an APS frame.

FIG. 11 is a sequence chart illustrating switching using an APS frame with Class Protection (CP) specified. A sequence is illustrated for the nodes NE1 and NE2 in FIG. 4 assuming that a packet loss is detected only in Class H as in FIG. 4. In FIG. 11, content of a Request State field in a transmitted or received APS frame is represented with two alphabet characters, and contents of Request/Bridged Signal fields are represented with two digits.

Usually, No Request (NR) is set to the Request State field of an APS frame, which indicates that there are no switching requests. Also, 0/0 are set to Request/Bridged Signal fields, respectively, which indicate that communication channels currently used for all Classes A-H are working channels, and destination communication channels are also working channels. NE1 and NE2 transmit and receive the APS frame to/from each other, and no switching occurs.

Next, assume that a packet loss in Class H is detected at NE2 (S1). NE2 sets CP (0011) to Request State field of the APS frame, and requests linear protection switching in terms of Classes. NE2 sets 4/4 to Request/Bridged Signal fields as specified in FIG. 10B. The APS frame is denoted by "CP (4/4)". NE2 transmits CP (4/4) to NE1 to request switching to a protection channel only in Class H. Also, NE2 switches only Class H to a protection channel.

In response to receiving CP (4/4), NE1 switches only Class H to a protection channel, and transmits NR (4/4) to NE2 that indicates No Request. After that, NE1 and NE2 transmit/receive NR (4/4) to/from each other.

Although a CCM frame and an APS frame are used for linear protection switching in terms of Classes according to the above embodiment, any other arbitrary Ethernet frames may be used alternatively.

<Apparatus Configuration According to First Embodiment>

Figure 12:
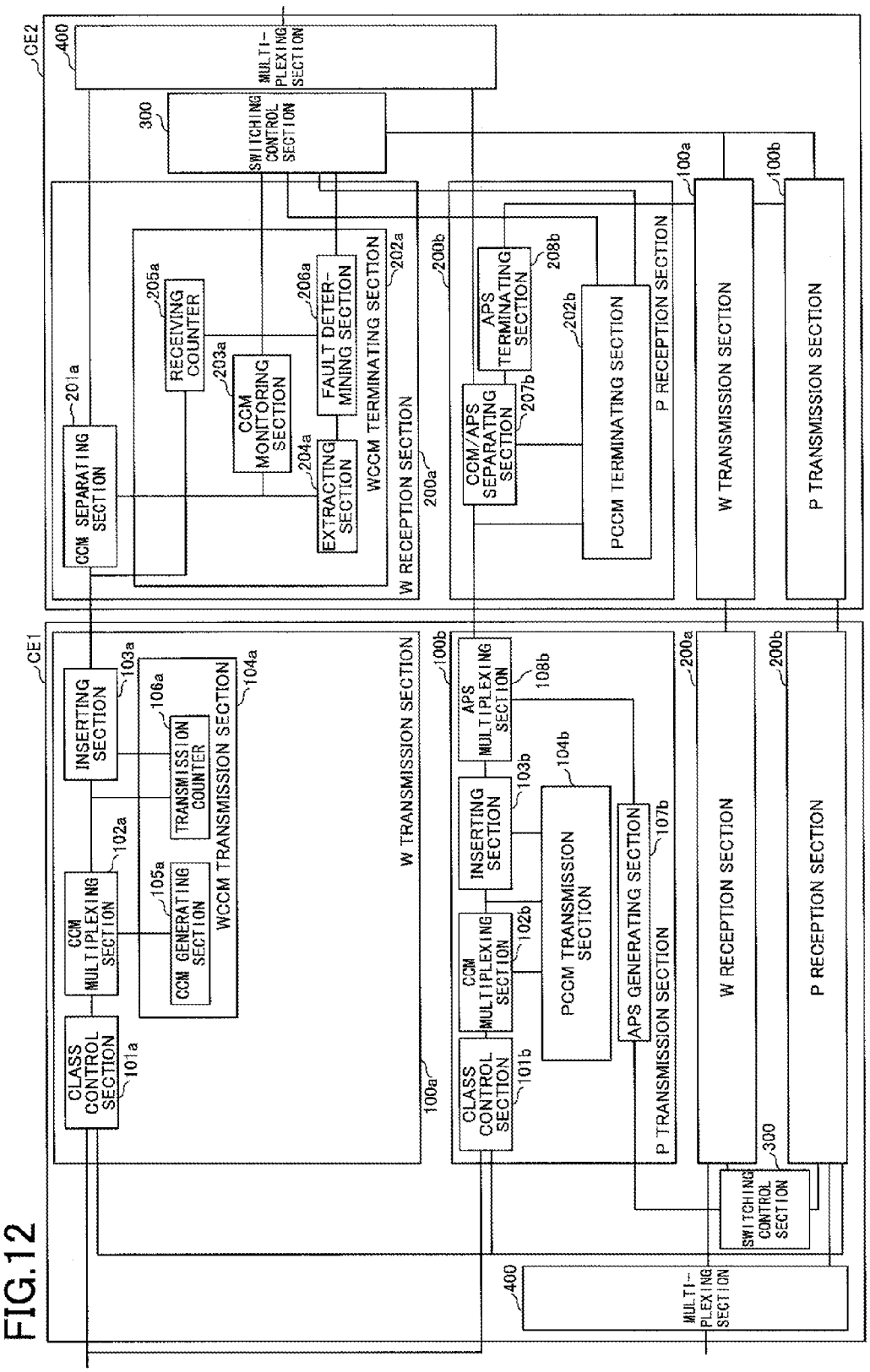
FIG. 12 is a functional block diagram of apparatuses according to a first embodiment.

With reference to FIG. 12, an apparatus configuration will be described according to a first embodiment. FIG. 12 is a functional block diagram of apparatuses according to the first embodiment. Although two apparatuses are illustrated in FIG. 12 for the sake of explanation, embodiments of the present invention are not limited to a configuration with two apparatuses.

The apparatuses CE1 and CE2 in FIG. 12 correspond to, for example, the edge nodes CE1 and CE2 in FIG. 4. Although the apparatuses CE1-CE2 are assumed to have the same configuration in the following, they may have respective configurations different from each other if necessary. Also, embodiments of the present invention are not limited to that, but may be applicable to an apparatus set up as a Down MEP that terminates a control frame of OAM functions in Layer 2.

In the following, for the sake of explanation, working elements are designated by codes with a suffix "a" such as 100a, and protection elements are designated by codes with a suffix "b" such as 100b in the multiple drawings. Also, although the working elements and the protection elements are illustrated as if they had different configurations for the sake of explanation, they may be configured with the same elements.

The apparatus CE1 includes a working (W) transmission section 100a, a protection (P) transmission section 100b, a working (W) reception section 200a, a protection (P) reception section 200b, switching control section 300, and a multiplexing section 400.

The W transmission section 100a includes a class control section 101a, a CCM multiplexing section 102a, an inserting section 103a, and a working (W) CCM transmission section 104a. The WCCM transmission section 104a includes a CCM generating section 105a and a transmission counter 106a.

The class control section 101a receives a user frame from an upper-layer apparatus, and controls transmission and/or stoppage of the user frame in terms of Classes. The class control section 101a transfers the user frame to the CCM multiplexing section 102a.

The CCM multiplexing section 102a multiplexes a CCM frame generated by the CCM generating section 105a with the user frame, and transfers it to the inserting section 103a.

The inserting section 103a inserts an amount of transmission data counted by the transmission counter 106a into a CCM frame generated at a certain time interval for each of Classes, and transmits it on a communication channel. The amount of transmission data is inserted into a Reserved field illustrated in FIG. 7 starting at the fourth bit and represented with 29 bits.

The WCCM transmission section 104a corresponds to a Down MEP described above, which is a start point of a CCM frame.

The CCM generating section 105a generates a CCM frame at a certain time interval for each of Classes, and transfers the generated CCM frame to the CCM multiplexing section 102a. By specifying a Class with the upper three bits of the Reserved field illustrated in FIG. 7, a CCM frame can be associated with a Class.

The transmission counter 106a counts the amount of transmission data of user frames for each of Classes. The unit of an amount of transmission data may be the number of frames, the number of bytes, or the like.

Figure 13:
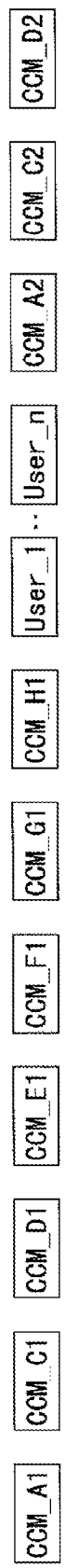
FIG. 13 is a schematic view illustrating transfer of the number of transmission bytes using CCM frames according to the first embodiment.

With reference to FIG. 13, a transfer method of an amount of transmission data will be described. FIG. 13 is a schematic view illustrating transfer of the number of transmission bytes using CCM frames according to the first embodiment. In FIG. 13, CCM frames for Class A, C-H are designated with CCM_A1, CCM_C1-H1, CCM_A2, and CCM_C2-H2, and user frames are designated with User_1-n. A frame closer to the left end in FIG. 13 is transmitted earlier in time. As illustrated in FIG. 13, CCM frames are transmitted at predetermined intervals for Classes, for example, intervals of 3.3 ms.

The transmission counter 106a counts the amount of transmission data of User_1-n, and transfers the counted value to the inserting section 103a. If User_1-n are data in Class C, the inserting section 103a inserts the amount of transmission data into CCM_C2, which is a first CCM frame transmitted in Class C after transmission of User_1-n. In this way, an amount of transmission data can be transferred for each of Classes.

The P transmission section 100b includes a class control section 101b, a CCM multiplexing section 102b, an inserting section 103b, and a protection (P) CCM transmission section 104b. These elements are substantially the same as the class control section 101a, the CCM multiplexing section 102a, the inserting section 103a, and the WCCM transmission section 104a of the W transmission section 100a, respectively, and their description is omitted.

The P transmission section 100b further includes an APS generating section 107b and an APS multiplexing section 108b.

The APS generating section 107b generates an APS frame based on switching information received from the switching control section 300, and transfers it to the APS multiplexing section 108b. The switching information specifies which channel, a working channel or a protection channel, is used for each of Classes.

The APS multiplexing section 108b multiplexes an APS frame generated by the APS generating section 107b with the user frame received from the inserting section 103b, and transfers it on a communication channel.

The W reception section 200a and the P reception section 200b are substantially the same as a working (W) reception section 200a and a protection (P) reception section 200b of CE2 described later, respectively, and their description is omitted.

The switching control section 300 generates switching information if a packet loss for a Class is indicated from the W reception section 200a, which is a reception section for a communication channel in use, or from the fault determining section 206a of the P reception section 200b so that data in the corresponding Class is switched to another communication channel. For example, if a packet loss in Class H is indicated from the fault determining section 206a of the W reception section 200a in use, switching information is generated for data in Class H to be switched into a protection channel. The switching control section 300 transfers the generated switching information to the APS generating section 107b of the P transmission section 100b.

The switching control section 300 also generates switching information if a LOC (Loss Of Continuity) is indicated from the W reception section 200a, which is a reception section for a communication channel in use, or from the fault determining section 206a of the P reception section 200b so that data in all Classes are switched to another communication channel. For example, if a LOC is indicated from the CCM monitoring section 203a of the W reception section 200a in use, switching information is generated for data in all Classes A-H to be switched into a protection channel. The switching control section 300 transfers the generated switching information to the APS generating section 107b of the P transmission section 100b.

Even if a LOC or a packet loss occurs on a communication channel in use as described above, the switching control section 300 suspends switching if a fault such as a LOC has been detected on the destination communication channel. In this case, switching information is not changed to maintain current switching information.

The multiplexing section 400 multiplexes user frames received by the W reception section 200a and the P reception section 200b, and transfers them to the egress section.

The apparatus CE2 includes a working (W) transmission section 100a, a protection (P) transmission section 100b, a working (W) reception section 200a, a protection (P) reception section 200b, switching control section 300, and a multiplexing section 400.

The W transmission section 100a, the P transmission section 100b, the switching control section 300, and the multiplexing section 400 are substantially the same as the W transmission section 100a, the P transmission section 100b, the switching control section 300, and the multiplexing section 400 of CE1, respectively, and their description is omitted.

The W reception section 200a includes a CCM separating section 201a and a working (W) CCM terminating section 202a. The WCCM terminating section 202 includes a CCM monitoring section 203a, an extracting section 204a, a receiving counter 205a, and a fault determining section 206a.

The CCM separating section 201a separates CCM frames from user frames and CCM frames received from a communication channel.

The WCCM terminating section 202a corresponds to a Down MEP described above, and terminates CCM frames.

The CCM monitoring section 203a monitors a frame loss of a CCM frame, and indicates a LOC to the switching control section 300 if detecting it.

The extracting section 204a extracts an amount of transmission data from a CCM frame received at a certain time interval for each of Classes, which has been inserted by the inserting section 103a of CE1. The extracting section 204a transfers the amount of transmission data extracted for each of Classes to the fault determining section 206a.

The receiving counter 205a counts an amount of received data of user frames for each of Classes. The unit of an amount of received data may be the number of frames, the number of bytes, or the like. The receiving counter 205a transfers the amount of received data to the fault determining section 206a.

The count method of an amount of received data is substantially the same as the count method of an amount of transmission data described with reference to FIG. 13. The receiving counter 205a counts an amount of received data of user frames in each of Classes that are received between CCM frames received at predetermined intervals. In the example illustrated in FIG. 13, the receiving counter 205a counts an amount of data of user frames in Class A received between CCM_A1 and CCM_A2. For other Classes, the receiving counter 205a similarly counts an amount of data of user frames received between two CCM frames. In this way, an amount of received data for each of Classes can be counted for each of Classes.

The fault determining section 206a compares an amount of received data counted by the receiving counter 205a with an amount of transmission data extracted by the extracting section 204a for each of Classes. If the amount of received data is less than the amount of transmission data, the fault determining section 206a determines it as a packet loss, and indicates the packet loss to the switching control section 300 for each of Classes.

The P reception section 200b includes a PCCM terminating section 202b, a CCM/APS separating section 207b, and an APS terminating section 208b. The PCCM terminating section 202b is substantially the same as the WCCM terminating section 202a, and its description is omitted.

The CCM/APS separating section 207b separates CCM frames and APS frames from user frames, CCM frames and APS frames received via a communication channel.

The APS terminating section 208b receives an APS frame generated by the APS generating section 107b and transmitted by the APS multiplexing section 108b. The APS terminating section 208b determines whether Request State field of the receive APS frame is "0011" (Class Protection: CP). If Request State field is "0011", the APS terminating section 208b extracts switching information specified in Request Signal/Bridged Signal fields of the received APS frame for each of Classes. The APS terminating section 208b transfers the extracted switching information for each of Classes to the class control sections 101a and 101b of the working (W) transmission section 100a and the protection (P) transmission section 100b, respectively.

A part of or all of the elements illustrated in FIG. 12 may be provided for each of Classes. Also, a part of or all of the elements illustrated in FIG. 12 may be integrated, separated or omitted.

<Apparatus Configuration According to Second Embodiment>

Figure 14:
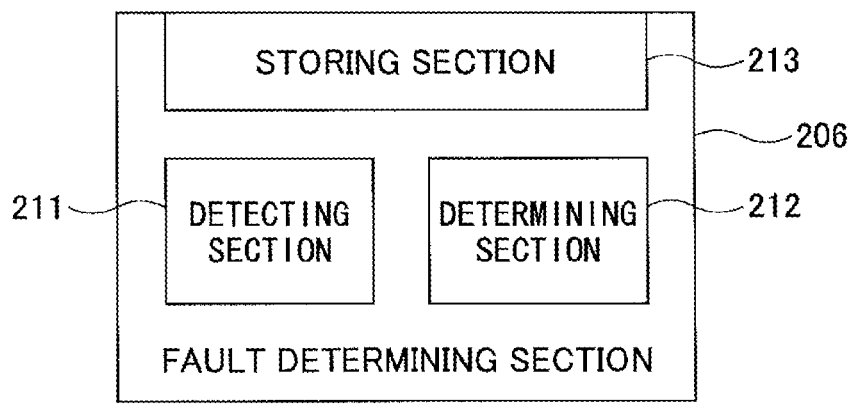
FIG. 14 is a functional block diagram of a fault determining section according to a second embodiment.

With reference to FIG. 14, an apparatus configuration will be described according to a second embodiment. FIG. 14 is a functional block diagram of a fault determining section according to the second embodiment. The configuration of the apparatus other than the fault determining section according to the second embodiment is the same as the apparatus configuration according to the first embodiment illustrated in FIG. 12, and its description is omitted.

The fault determining section 206 includes a detecting section 211, a determining section 212, and a storing section 213.

The detecting section 211 calculates a received ratio based on an amount of received data obtained from the receiving counter 205a and an amount of transmission data obtained from the extracting section 204a. The received ratio is, for example, a ratio of an amount of received data to an amount of transmission data. The detecting section 211 transfers the calculated received ratio to the determining section 212.

The determining section 212 compares the received ratio obtained from the detecting section 211 with a threshold value obtained from the storing section 213, determines it as a packet loss if the received ratio is less than the threshold value, and indicates it to the switching control section 300.

The storing section 213 stores a threshold value of the received ratio. The threshold value is set via a control section (not illustrated) that collects alarms, controls the elements in the apparatus, and the like. The threshold value can be controlled by software, and can be changed if necessary.

A part of or all of the elements illustrated in FIG. 14 may be provided for each of Classes. Also, a part of or all of the elements illustrated in FIG. 14 may be integrated, separated or omitted.

<Switchback in Terms of Classes According to Third Embodiment>

Figure 15:
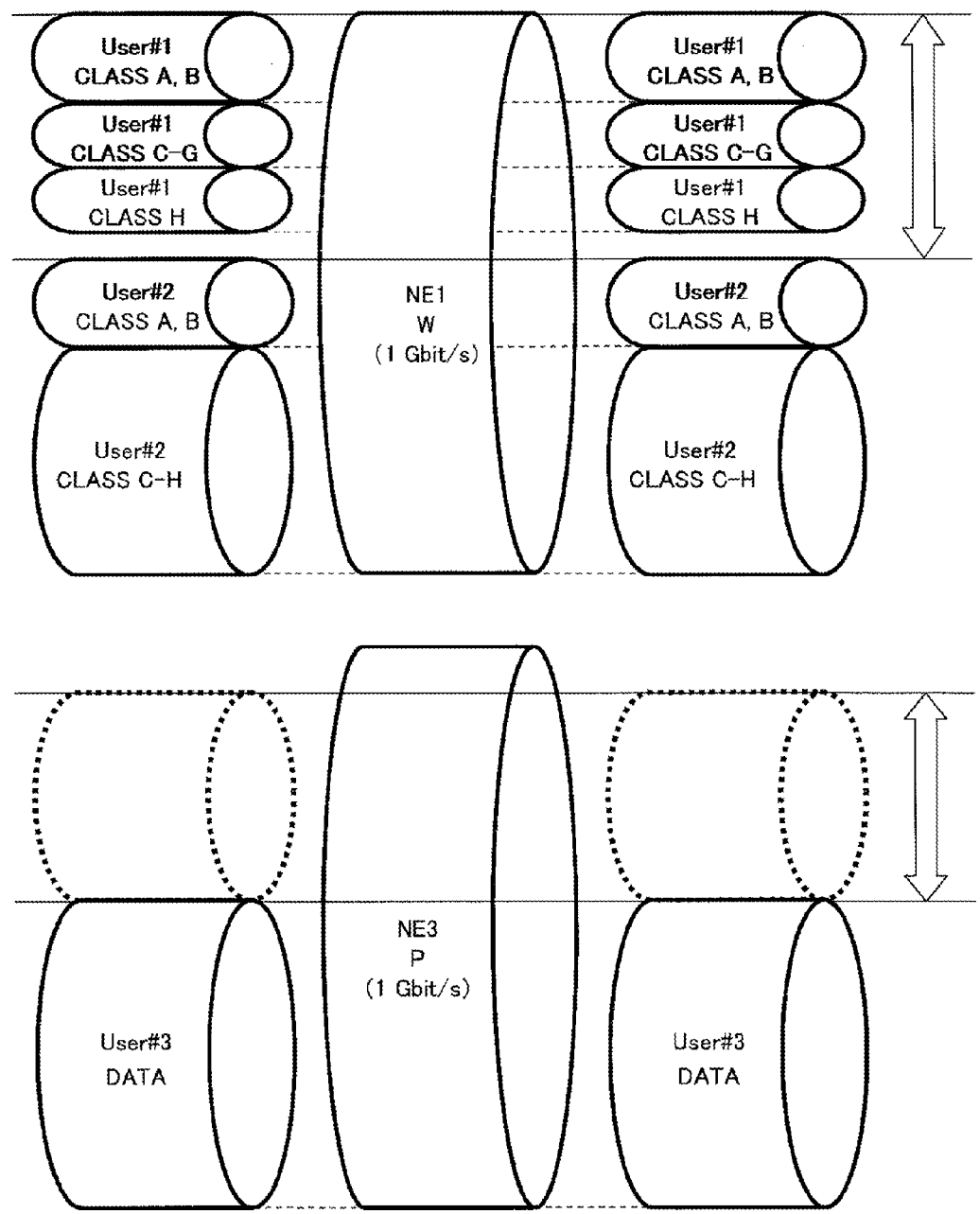
FIG. 15 is a schematic view illustrating a switchback based on linear protection in terms of Classes according to a third embodiment.

With reference to FIG. 15, a switchback based on linear protection in terms of Classes will be described. FIG. 15 is a schematic view illustrating a switchback based on linear protection in terms of Classes according to a third embodiment.

Under the circumstance illustrated in FIG. 5, if a fault is not detected on a working channel any more and data can be switched back to the working channel from a protection channel on which data has been switched, without exceeding the bandwidth of the working channel, data being transmitted and received on the protection channel is going to be switched back to the working channel in terms of Classes as illustrated in FIG. 15.

In FIG. 5, data in Class H of User #1 is transmitted and received via the node NE3 on a protection channel. On the other hand, in FIG. 15, all data in Classes A-H of User #1 flows into NE1 on the working channel, and only data of User #3 flows into NE3 on the protection channel.

Figure 16:
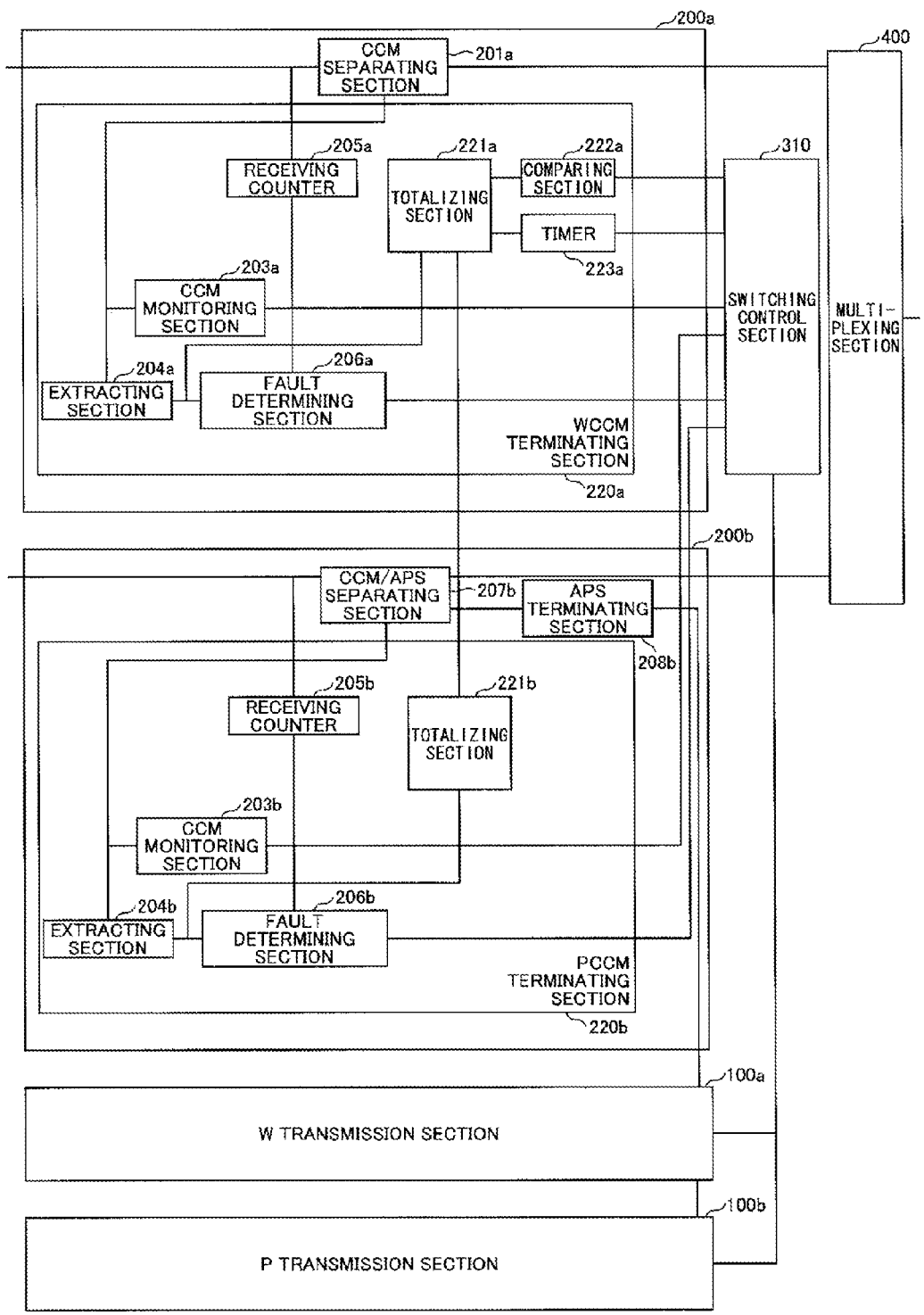
FIG. 16 is a functional block diagram of an apparatus according to the third embodiment.

Next, with reference to FIG. 16, an apparatus configuration will be described according to the third embodiment. FIG. 16 is a functional block diagram of an apparatus according to the third embodiment. Although the configuration illustrated in FIG. 16 is similar to that of CE2 in FIG. 12, it differs from CE2 in that it includes a WCCM terminating section 220a, a PCCM terminating section 220b and switching control section 310 instead of the WCCM terminating section 202a, the PCCM terminating section 202b and the switching control section 300, respectively. The other elements are the same as in FIG. 12, and their description is omitted. Although only one apparatus is illustrated in FIG. 16, linear protection may be implemented by disposing an additional apparatus having substantially the same configuration and set as a Down MEP as in FIG. 12.

The WCCM terminating section 220a includes a CCM monitoring section 203a, an extracting section 204a, a receiving counter 205a, a fault determining section 206a, a totalizing section 221a, a comparing section 222a, and a timer 223a. The CCM monitoring section 203a, the extracting section 204a, the receiving counter 205a, and the fault determining section 206a are the same as in FIG. 12, and their description is omitted.

The totalizing section 221a obtains the sum of amounts of transmission data received by the W reception section and the P reception section. First, the totalizing section 221a sums up amounts of transmission data for Classes extracted by the extracting section 204a. Next, the totalizing section 221a of the WCCM terminating section 220a adds the amounts of transmission data of all Classes and amounts of transmission data extracted by the extracting section 204b of the PCCM terminating section 220a, to calculate the total amount of transmission data. The amount of transmission data extracted by the extracting section 204b of the PCCM terminating section 220a is indicated to the totalizing section 221a of the WCCM terminating section 220a via the totalizing section 221b of the PCCM terminating section 220b.

The totalizing section 221a increases the total amount of transmission data every time when a CCM frame is received, and initializes the total amount to zero when the timer 223a expires. For example, for obtaining an amount of transmission data per second, the total amount is increased for a second, and is initialized every second.

The comparing section 222a converts the total amount calculated by the totalizing section 221a into the number of bits per second and compares it with a guaranteed minimum bandwidth (bit/s) of data flowing into the W reception section or the P reception section for each of Classes. The comparing section 222a determines whether the converted total amount calculated by the totalizing section 221a is less than the guaranteed minimum bandwidth, and indicates the compared result to the switching control section 310. Alternatively, a comparison may be done whether the converted total amount is less than the guaranteed minimum bandwidth by a predetermined bandwidth, to indicate it to the switching control section 310.

The timer 223a is set with a time for calculating the total amount, and indicates the total amount to the totalizing section 221a when the time expires. For example, for obtaining an amount of transmission data per second, the timer 223a is set with one second.

The PCCM terminating section 220b in FIG. 16 includes a CCM/APS separating section 207b, an APS terminating section 208b, and a PCCM terminating section 220b. The CCM/APS separating section 207b and the APS terminating section 208b are the same as in FIG. 12, the PCCM terminating section 220b is the same as the WCCM terminating section 220a, and their description is omitted.

If the compared result indicates that the converted total amount calculated by the totalizing section 221a is less than the guaranteed minimum bandwidth or less than the guaranteed minimum bandwidth by the predetermined bandwidth, the switching control section 310 generates switching information so that data being transmitted and received on a protection channel is going to be switched back to the working channel. The switching control section 310 indicates the generated switching information to the APS generating section 107b of the P transmission section 100b.

For example, suppose in the example in FIG. 5 that the sum of amounts of transmission data in Classes A and B of User #1 is 60 Mbps, the sum of amounts of transmission data in Classes C-G is 50 Mbps, the amount of transmission data in Class H is Mbps, and the guaranteed minimum bandwidth for User #1 is 400 Mbps. In this case, the total amount of transmission data in all Classes A-H of User #1 is 160 Mbps, which is less than the guaranteed minimum bandwidth of 400 Mbps. Therefore, the switching control section 310 generates switching information so that data in Class H of User #1 being transmitted and received via NE3 on the protection channel in FIG. 5 is switched back to NE1 on the working channel as illustrated in FIG. 15. The switching control section 310 indicates the generated switching information to the APS generating section 107b of the P transmission section 100b.

The APS generating section 107b sets "0011(CP)" to Request State field of the APS frame based on the switching information indicated by the switching control section 310. Also, the APS generating section 107b changes Requested Signal/Bridged Signal fields from "4/4" to "0/0" based on the switching information.

Operations for a switchback are substantially the same as linear protection switching operation in terms of Classes.

FIG. 15 illustrates the state after the switchback described above.

A part of or all of the elements illustrated in FIG. 16 may be provided for each of Classes. Also, a part of or all of the elements illustrated in FIG. 16 may be integrated, separated or omitted.

<Linear Protection Switching Method in Terms of Classes>

With reference to FIG. 17, linear protection switching method in terms of Classes will be described. FIG. 17 is a flowchart illustrating switching method based on linear protection according to an embodiment of the present invention. In the following, although it is assumed that the method in FIG. 17 is executed by the apparatus illustrated in FIG. 12, it may be executed by the apparatus illustrated in FIG. 14 or 15. Also, in the following, operations of the apparatus CE1 and operations of the apparatus CE2 in FIG. 12 are described separately, and the elements having the same numerical codes in FIG. 12 may execute the same operations.

Assume that the apparatuses CE1 and CE2 in FIG. 12 transmit and receive data of all Classes on a working channel. The method in FIG. 17 may be applied to a case where data of a part of or all of Classes is being transmitted and received on a protection channel, and the data of a part of or all of Classes is going to be switched back to a working channel.

At Step S11, the inserting section 103a of the W transmission section 100a of CE1 inserts an amount of transmission data for each of Classes indicated by the transmission counter 106a into a CCM frame of the corresponding Class.

At Step S12, the inserting section 103a transmits user frames and CCM frames.

Steps S11 and S12 are executed in the P transmission section 100b of CE1.

At Step S13, the W reception section 200a of CE2 terminates the user frames and CCM frames. The CCM separating section 201a of the W reception section 200a of CE2 separates a CCM frame from the received data, and transfers it to the CCM monitoring section 203a and the extracting section 204a.

At Step S14, the extracting section 204a of the W reception section 200a of CE2 extracts the amount of transmission data for each of Classes from the CCM frame of the Class transferred from the CCM separating section 201a, and indicates it to the fault determining section 206a. Also, the receiving counter 205a counts the amount of received data in the received user frames for each of Classes, and indicates it the fault determining section 206a. The fault determining section 206a compares the indicated amount of transmission data and the amount of received data. If the amount of transmission data is greater, the procedure goes back to Step S13. Otherwise, the procedure goes to Step S15. In this example, although the amount of transmission data and the amount of received data are compared, the amount of transmission data may be compared with the sum of the amount of received data and the predetermined amount of data or the bandwidth.

At Step S15, the CCM monitoring section 203a of the W reception section 200a of CE2 determines whether a LOC is generated, and if a LOC is generated, indicates it to the switching control section 300. If a LOC is generated, the procedure goes back to Step S13.

At Step S16, the switching control section 300 of CE2 generates switching information to switch data in a Class to a protection channel if the switching control section 300 of CE2 is indicated with a packet loss of the corresponding Class from the fault determining section 206a of the W reception section 200a. Also, the switching control section 300 determines a destination protection channel for data in all Classes if it receives a LOC indication from the CCM monitoring section 203a of the W reception section 200a. The switching control section 300 transfers the determined destination protection channel as switching information to the APS generating section 107b of the P transmission section 100b. The switching information specifies which channel is used for each of Classes, a working channel or a protection channel.

At Step S17, the APS generating section 107b of the P transmission section 100b of CE2 sets a destination channel into an APS frame. Specifically, the APS generating section 107b sets values in Requested Signal/Bridged Signal fields as specified in FIG. 10 based on the switching information received from the switching control section 300. The APS generating section 107b transfers the generated APS frame to the APS multiplexing section 108b.

At Step S18, the APS multiplexing section 108b of the P transmission section 100b of CE2 transmits the APS frame.

At Step S19, the P reception section 200b of CE1 terminates the APS frame. The CCM/APS separating section 207b of the P reception section 200b of CE1 separates a CCM frame and a APS frame from the received user frame, CCM frame and APS frame. The CCM/APS separating section 207b transfers the APS frame to the APS terminating section 208b.

At Step S20, the APS terminating section 208b of the P reception section 200b of CE1 determines whether Request State field of the received APS frame is "0011 (Class Protection: CP)". If Request State field is "0011", the APS terminating section 208b extracts switching information specified in Request Signal/Bridged Signal fields of the received APS frame for each of Classes. The APS terminating section 208b transfers switching information extracted for each of Classes to the class control sections 101a and 101b of the W transmission section 100a and P transmission section 100b, respectively. The class control section 101a and 101b determine whether the switching information designates a working channel as a destination channel, namely, whether Request Signal/Bridged Signal fields are "0/0" for each of Classes. If they are "0/0", the procedure goes to Step S21. Otherwise, the procedure goes to Step S22.

At Step S21, the class control section 101a of the W transmission section 100a of CE1 starts transmission of user frames of a Class whose Request Signal/Bridged Signal fields are determined to be "0/0" on a working channel. If the destination channel is unchanged, it continues transmission on the working channel.

Moreover, the class control section 101b of the P transmission section 100b of CE1 may stop transmitting user frames of a Class whose Request Signal/Bridged Signal field is determined to be "0/0" on the protection channel (P). Stoppage on the protection channel may be determined discretionally.

At Step S22, the class control section 101a of the W transmission section 100a of CE1 starts transmission of user frames of a Class whose Request Signal/Bridged Signal fields are determined not to be "0/0" on a protection channel. If the destination channel is unchanged, it continues transmission on the protection channel.

Moreover, the class control section 101a of the P transmission section 100a of CE1 may stop transmitting the user frame of a Class whose Request Signal/Bridged Signal fields are determined not to be "0/0" on the working channel. Stoppage on the working channel may be determined discretionally.

Alternatively, the same data may be transmitted on a working channel and a protection channel at both of CE1 and CE2, and the multiplexing section 400 of each of the apparatuses may select data received on the working or the protection channel based on a direction from the switching control section 300 or the class control section 101.

A part of or all of steps illustrated in FIG. 17 may be executed for each of Classes at the same time or sequentially. Also, a part of or all of steps illustrated in FIG. 16 may be integrated, separated or omitted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system, comprising:
   a transmitting apparatus;
   a receiving apparatus; and
   a plurality of communication channels provided between the transmitting apparatus and the receiving apparatus and having a redundant configuration,
   wherein the receiving apparatus
      detects a fault of data belonging to a class from among multiple sets of data that belong to different classes and are transmitted from the transmitting apparatus via a first communication channel of the communication channels,
      switches the data that belongs to the class and whose fault has been detected to a second communication channel of the communication channels that is being unused for transmission of the data belonging to the class,
      generates switching information including information about the class of the data whose fault has been detected and the second communication channel to which the data belonging to the class is switched, and
      transmits the switching information to the transmitting apparatus; and
   wherein the transmitting apparatus
      receives the switching information from the receiving apparatus, and
      switches the data that belongs to the class and whose fault has been detected to the second communication channel.

2. The system as claimed in claim 1, wherein the receiving apparatus transmits the switching information using an automatic protection switching (APS) frame or an Ethernet frame.

3. The system as claimed in claim 1, wherein the switching information further includes a request for switching a communication channel used for transmitting data for each of the classes.

4. The system as claimed in claim 1, wherein the receiving apparatus
   counts an amount of received data for each of the classes,
   compares the amount of received data with an amount of transmission data transferred from the transmitting apparatus for each of the classes, and
   detects the fault of the data belonging to the class when the amount of received data for the class is less than the amount of transmission data for the class.

5. The system as claimed in claim 1, wherein the receiving apparatus
   counts an amount of received data for each of the classes,
   calculates a received ratio representing a ratio of the amount of received data to an amount of transmission data transferred from the transmitting apparatus for each of the classes, and
   detects the fault of the data belonging to the class when the received ratio for the class is less than a predetermined value.

6. The system as claimed in claim 4, wherein the transmitting apparatus transfers the amount of transmission data using a continuity check message (CCM) frame or an Ethernet frame generated for each of the classes.

7. The system as claimed in claim 4, wherein the amount of received data is an amount of received data of user frames for each of the classes received between two adjacent continuity check message (CCM) frames or Ethernet frames generated by the transmitting apparatus for each of the classes at predetermined intervals.

8. The apparatus system as claimed in claim 6, wherein the transmitting apparatus
   counts an amount of transmission data of user frames between two adjacent continuity check message (CCM) frames or Ethernet frames generated at predetermined intervals for each of the classes; and
   inserts the amount of transmission data into the CCM frame or Ethernet frame to transmit the amount of transmission data.

9. A method for switching a plurality of communication channels having a redundant configuration between a transmitting apparatus and a receiving apparatus transmitting and receiving data, the method comprising:
   having the receiving apparatus
      detect a fault of data belonging to a class from among multiple sets of data that belong to different classes and are transmitted from the transmitting apparatus via a first communication channel of the communication channels,
      switch the data that belongs to the class and whose fault has been detected to a second communication channel of the communication channels that is being unused for transmission of the data belonging to the class,
      generate switching information including information about the class of the data whose fault has been detected and the second communication channel to which the data belonging to the class is switched, and
      transmit the switching information to the transmitting apparatus, and
   having the transmitting apparatus
      receive the switching information from the receiving apparatus, and
      switch the data that belongs to the class and whose fault has been detected to the second communication channel.

10. The method as claimed in claim 9, wherein the switching information is transmitted using an automatic protection switching (APS) frame or an Ethernet frame.

11. The method as claimed in claim 9, wherein the switching information further includes a request for switching a communication channel used for transmitting data for each of the classes.

12. The method as claimed in claim 9, the method further comprising:
   having the receiving apparatus count an amount of received data for each of the classes,
   wherein the receiving apparatus compares the amount of received data with an amount of transmission data transferred from the transmitting apparatus for each of the classes, and detects the fault of the data belonging to the class when the amount of received data for the class is less than the amount of transmission data for the class.

13. The method as claimed in claim 9, the method further comprising:
having the receiving apparatus count an amount of received data for each of the classes,
wherein the receiving apparatus calculates a received ratio representing a ratio of the amount of received data to an amount of transmission data transferred from the transmitting apparatus for each of the classes, and detects the fault of the data belonging to the class when the received ratio for the class is less than a predetermined value.

14. The method as claimed in claim 12, wherein the amount of transmission data is transferred using a continuity check message (CCM) frame or an Ethernet frame generated for each of the classes by the transmitting apparatus.

15. The method as claimed in claim 12, wherein the amount of received data is an amount of received data of user frames for each of the classes received between two adjacent continuity check message (CCM) frames or Ethernet frames generated by the transmitting apparatus for each of the classes at predetermined intervals.

* * * * *